US007680385B2

(12) United States Patent
Bergeron et al.

(10) Patent No.: US 7,680,385 B2
(45) Date of Patent: Mar. 16, 2010

(54) SELF-SUPPORTED OPTICAL CORRELATOR

(75) Inventors: Alain Bergeron, Sainte-Foy (CA); Nichola Desnoyers, St-Nicolas (CA); Pascal Bourqui, Quebec (CA); Michel Doucet, St-Augustin-de-Desmaures (CA)

(73) Assignee: Institut National D'Optique, Sainte-Foy, Quebec (CA)

( * ) Notice: Subject to any disclaimer, the term of this patent is extended or adjusted under 35 U.S.C. 154(b) by 938 days.

(21) Appl. No.: 11/455,504

(22) Filed: Jun. 19, 2006

(65) Prior Publication Data

US 2007/0292093 A1 Dec. 20, 2007

(51) Int. Cl.
*G02B 6/00* (2006.01)

(52) U.S. Cl. ........................ 385/135; 385/139; 385/147

(58) Field of Classification Search .......... 385/135–139
See application file for complete search history.

(56) References Cited

U.S. PATENT DOCUMENTS

| | | | | |
|---|---|---|---|---|
| 3,608,994 | A | 9/1971 | McDonnell | |
| 3,704,949 | A * | 12/1972 | Thomas et al. | 356/71 |
| 3,802,762 | A | 4/1974 | Kiemie | |
| 4,277,137 | A * | 7/1981 | Upatnieks et al. | 359/560 |
| 5,073,006 | A * | 12/1991 | Horner et al. | 359/561 |
| 6,396,940 | B1 * | 5/2002 | Carrott et al. | 382/128 |
| 6,421,454 | B1 * | 7/2002 | Burke et al. | 382/131 |
| 6,640,042 | B2 * | 10/2003 | Araki et al. | 385/137 |
| 6,744,909 | B1 * | 6/2004 | Kostrzewski et al. | 382/115 |

OTHER PUBLICATIONS

Caulfield et al., "Improved Discrimination in Optical Character Recognition", Applied Optics (1969); 8(11): 2354-2356.
Horner et al., "Phase-Only Matched Filtering", Applied Optics (1984); 23(6): 812-816.
Hsu et al., "Optical Pattern Recognition Using Circular Harmonic Expansion", Applied Optics (1982); 21(22): 4016-4019.
Lugt, A. Vander, "Signal Detection by Complex Spatial Filtering", IEEE Transactions on Information Theory, pp. 139-145.

(Continued)

*Primary Examiner*—Akm E Ullah
(74) *Attorney, Agent, or Firm*—Merchant & Gould P.C.

(57) ABSTRACT

A self-supported optical correlator has a first holder having two opposite ends, one of the opposite ends being provided with anchor points, the other end being provided with a light source. The correlator also has a second holder having two opposite ends, one of which is provided with anchor points, the other being provided with a light receiving element, and a plurality of intermediary holders, each having two opposite ends provided with anchor points, at least one of the intermediary holders being provided with a spatial light modulator for projecting an image and another of the intermediary holders being provided with another spatial light modulator for projecting a filter. Each of the intermediary holders is provided with optical components secured within the holders. The said anchor points are adapted to secure the first, second and intermediary holders together linearly end to end; so that when the intermediary holders are assembled end to end, and the first holder is assembled at one extremity and the other holder is assembled at another extremity, the resulting assembly forms said optical correlator. The optical components are toleranced, and the anchor point serve to assemble a structure which does not require additional adjustments.

10 Claims, 5 Drawing Sheets

OTHER PUBLICATIONS

Weaver et al., "A Technique for Optically Convolving Two Functions", Applied Optics (1966); 5(7): 1248-1249.

Lugt, A. Vander, "Signal Detection by Complex Spatial Filtering", IEEE Transactions on Information Theory, pp. 139-145, Apr. 1964.

* cited by examiner

| ITEM | DESCRIPTION |
|---|---|
| 1 | ANCHOR POINT |
| 2 | TOLERANCED OPTICAL ELEMENTS |
| 3 | SLM |
| 4 | OPAQUE TUBULAR EXTERNAL STRUCTURE |
| 5 | CAMERA |
| 6 | LASER |
| 7 | TOLERANCED ENCLOSURE |

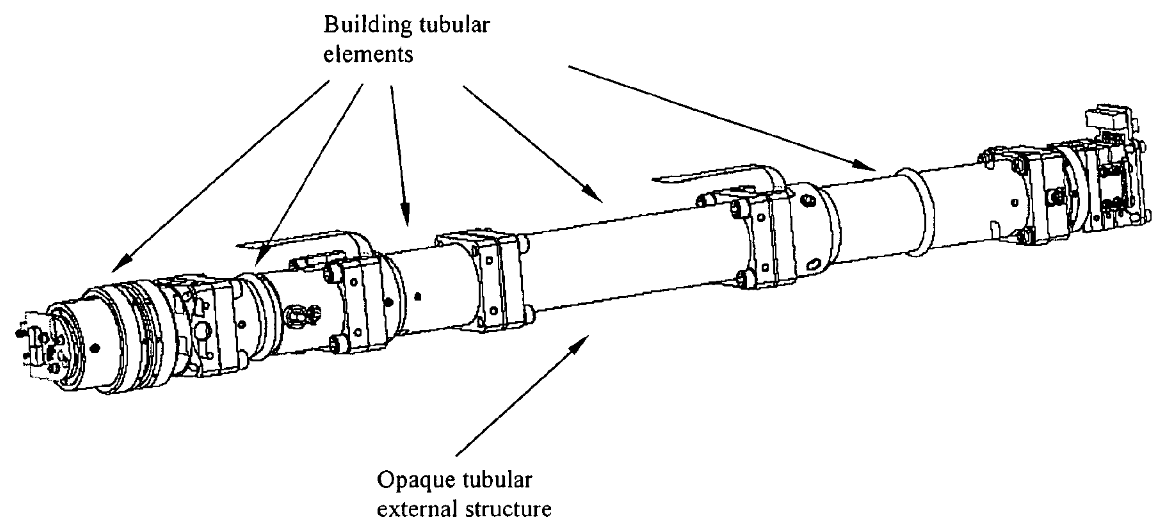
Figure 2: Perspective view of the tubular optical correlator

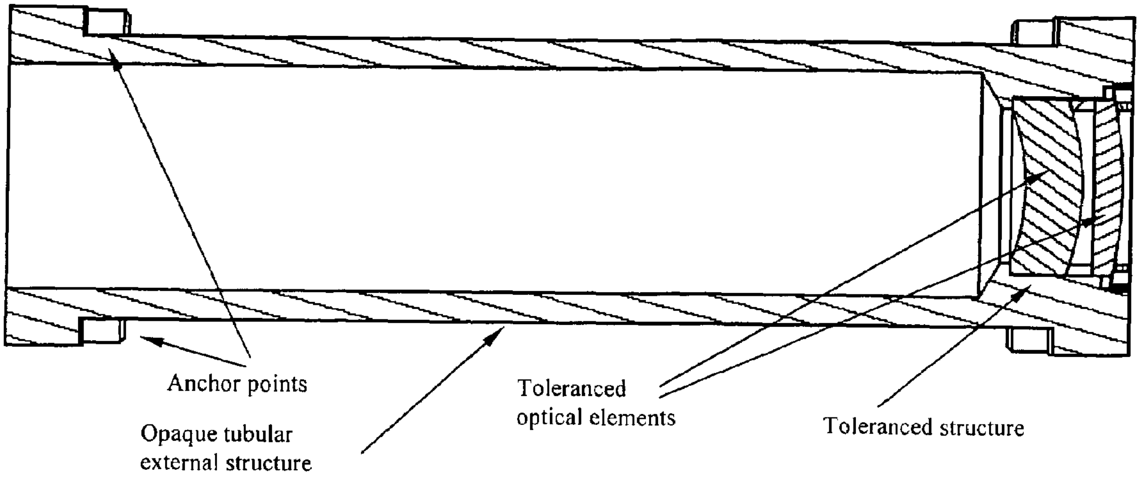
Figure 3: Cut view of the a tubular optical correlator module
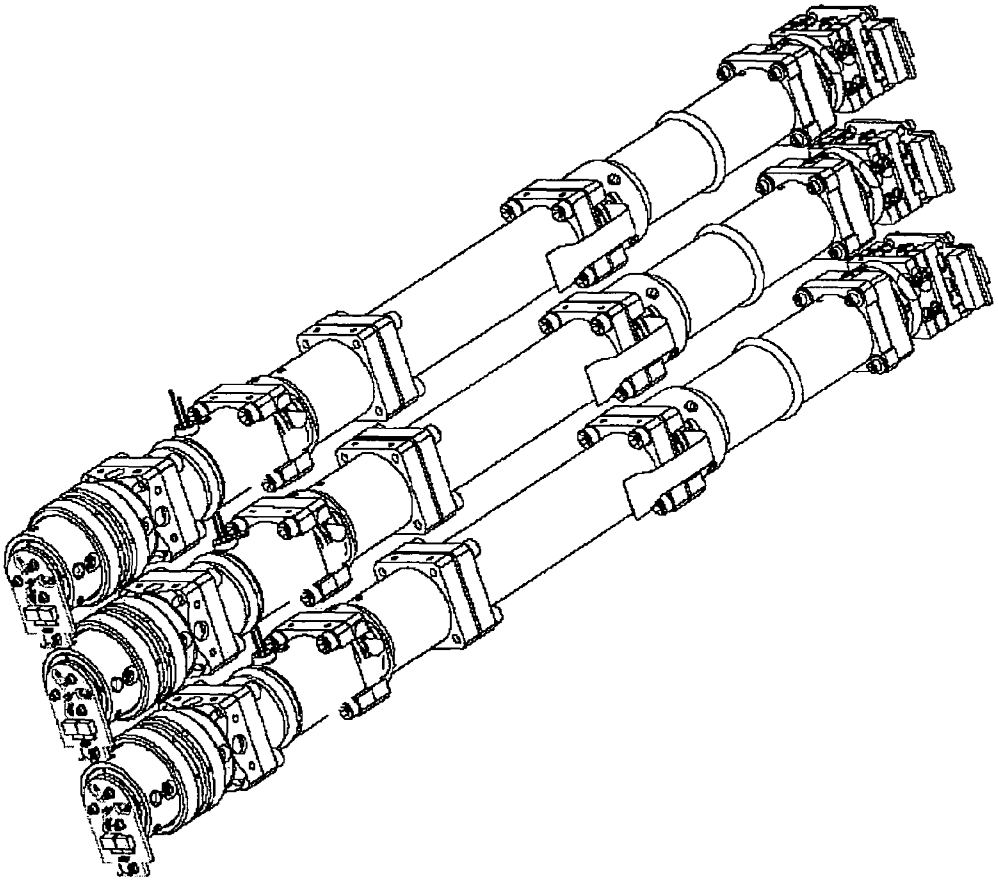
Figure 4: Example showing a stack of optical correlators

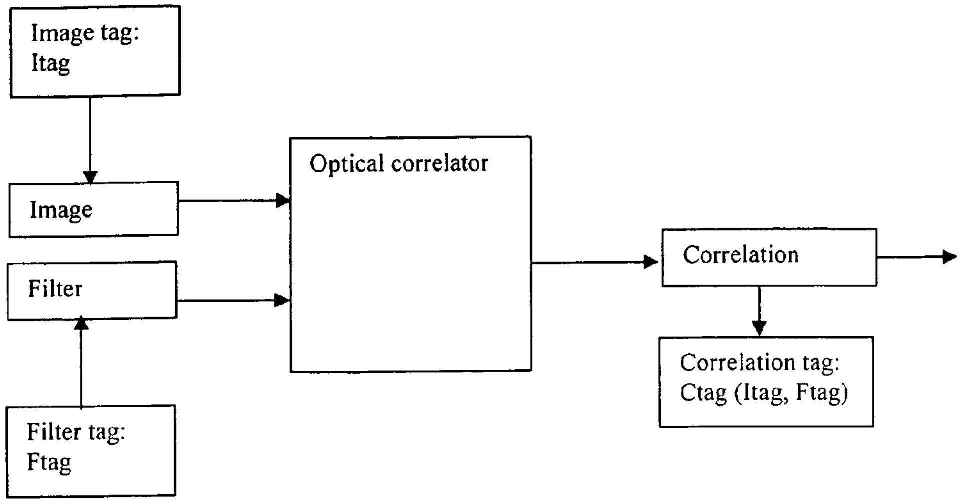
Figure 5: Illustration of the tagging principle
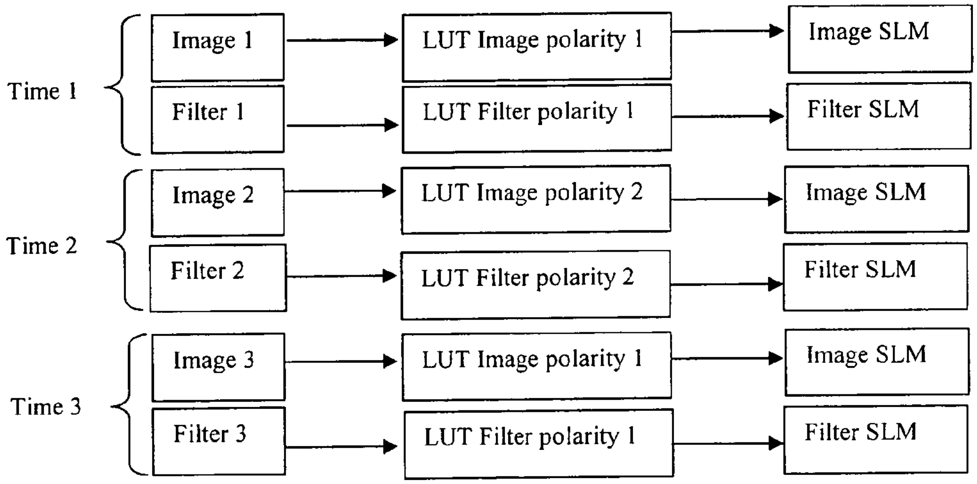
Figure 6: Illustration of the polarity LUT application
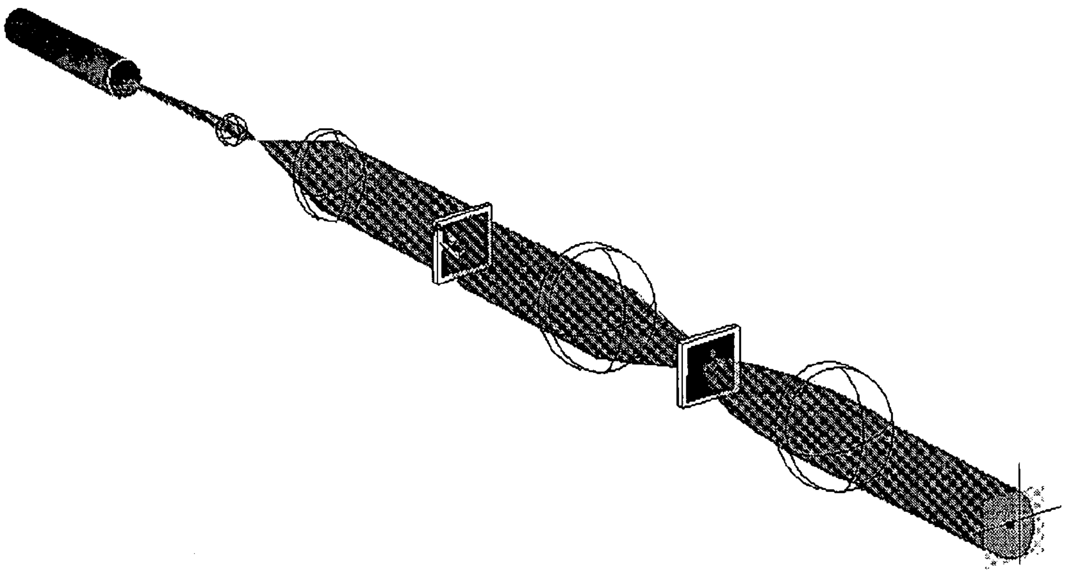

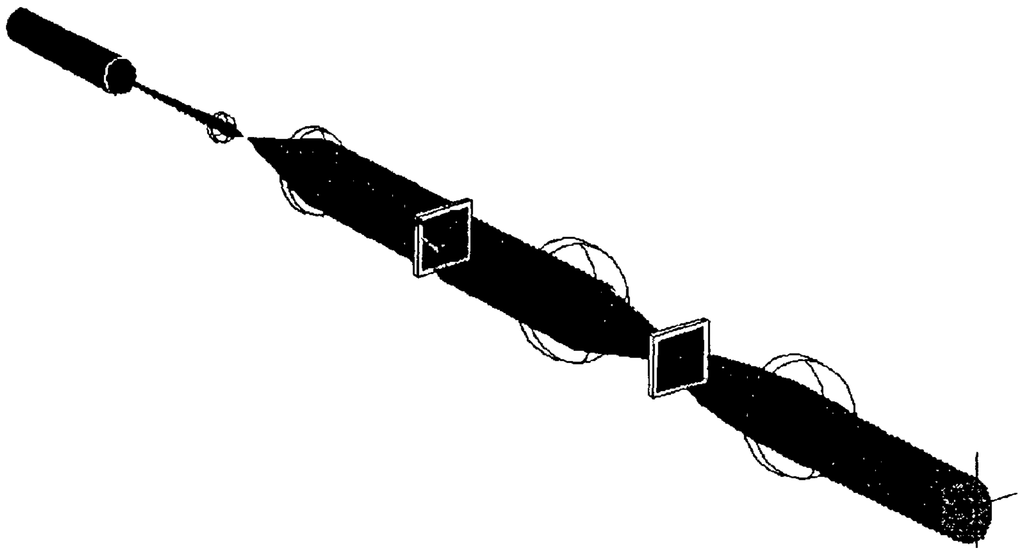
Figure 7: Schematic of the optical correlator operation (PRIOR ART).
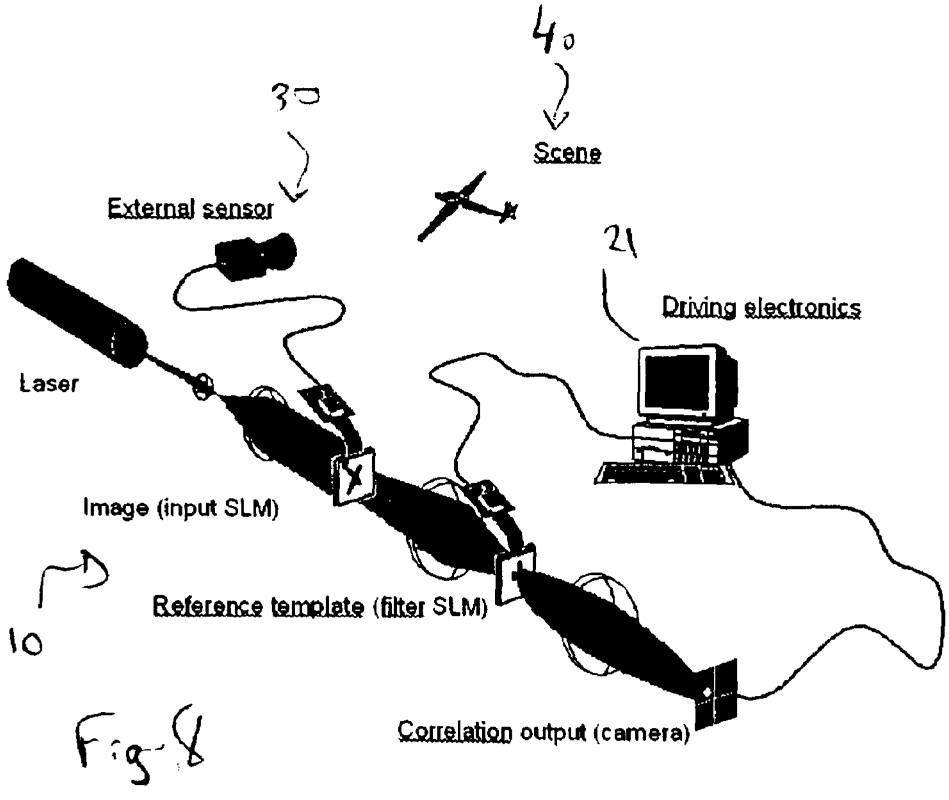
Optical correlator system illustration.

SELF-SUPPORTED OPTICAL CORRELATOR

FIELD OF THE INVENTION

The present invention relates to an optical correlator, and more specifically to such a correlator which is self-supported, and can be joined to other such optical correlators in a laterally stacked fashion.

BACKGROUND OF THE INVENTION

Various screening tasks require massive computing capabilities. Although computing devices have shown ever increasing processing power, there is still a need for high speed computing, especially when it comes to the screening of images. Optical correlators could eventually fill the gap between the applications and the processing requirements.

An optical correlator takes advantage of the powerful capabilities of light to perform real-time computation. As illustrated in FIG. 7 (Prior Art), a light beam incoming from a laser source is directed through a first set of lenses to expand its diameter. The light passes through a first spatial light modulator on which an image is displayed. Then, the modulated beam will undergo a first Fourier transform by passing through another lens. The Fourier transform is performed simply by the propagation of the light and as such is realised very rapidly.

It is an inherent property of a lens to perform a Fourier transform on an input image that will be observed at the front focal plane of the lens, provided that this image is displayed at the back focal plane of the lens. The optically-computed 2D Fourier transform signal will cross the filter plane. It is on this second spatial light modulator that the reference template corresponding to the searched object (the target) will be displayed. In fact, it is the Fourier transform of the reference template that is recorded. So after travelling trough this second spatial light modulator, a multiplication of two Fourier transforms is obtained. In the spatial domain this corresponds to a correlation. In order to achieve the conversion between the frequency and the spatial domains, a second Fourier lens is used and the beam exits the optical system in a parallel way. The camera is the last component of the correlator and detects the intensity all over the correlation plane. Basically, the system processing speed is limited only by the refresh rate of the electro-optic components (spatial light modulator, camera), because the computation itself is performed using the light.

The optical correlator principle has been known since the work of Vander Lugt. Since then, a lot of work has been spent on generating filters to enhance specific recognition performances such as multiple target recognition with composite filters, enhanced discrimination with phase-only filters, or rotation invariant recognition with circular harmonic filters. Various optical correlator types have also been proposed such as a Vander Lugt correlator. In this correlator architecture, similar to the one illustrated in FIG. 7, the image is displayed in the input plane whereas the filter is displayed in the frequency plane. The correlation is acquired at the output plane. The filter was at that time recorded on a spatial carrier. A Joint Transform correlator (JTC) was also proposed. In a JTC, both the image and the reference template are recorded in the input plane. The interference pattern is recorded in the frequency plane and sent back to the input plane to obtain the correlation in the frequency plane, after a second pass through the correlator. Despite extended work on optical correlator filters and architectures, it did not result in solutions which address the critical opto-mechanical structure required to obtain satisfactory optical correlation performances.

Various architecture implementations have been proposed for optical correlators, such as “Coherent Optical Correlator” (U.S. Pat. No. 4,277,137), and the optical correlator principle taught in “Holographic Information Storage and Retrieval” (U.S. Pat. No. 3,608,994). Architectures have also been proposed to make the overall system more compact, such as “Compact 2F Optical Correlator” (U.S. Pat. No. 5,073,006). These solutions usually result in optical set-ups where each individual optical element is inserted in a holder fixed on an optical table. This results in excessive production cost.

Furthermore, although optical correlator architectures were addressed in these patents, little or no consideration was devoted to the opto-mechanical structure that influences production cost and ease of alignment.

Nowadays, optical correlators are not widely spread either in terms of commercial applications or availability as commercial products. This is mainly due to the high production cost related to the aforementioned opto-mechanical structure and to the difficulty of alignment of the optical correlator.

Lack of market penetration has also left unaddressed other considerations of optical correlation implementation, such as heat dissipation and heat stabilization.

The possibility to achieve multichannel optical correlators has been addressed in U.S. Pat. No. 3,802,762. However, this possibility is limited by the availability of powerful laser sources that can drive multiple correlators simultaneously and by the interference that can be produced between the various channels.

SUMMARY OF THE INVENTION

The present invention is directed to an optical correlator which solves the above-mentioned deficiencies of the prior art.

In accordance with the invention, there is provided a self-supported optical correlator, comprising:

a first holder having two opposite ends, one of said opposite ends being provided with anchor points, the other of said opposite ends being provided with a light source;

a second holder having two opposite ends, one of said opposite ends being provided with anchor points, the other of said opposite ends being provided with a light receiving element, a plurality of intermediary holders, each having two opposite ends, each of said holders being provided with anchor points at each opposite end, at least one of said intermediary holders being provided with a spatial light modulator for projecting an image and another of said intermediary holders being provided with another spatial light modulator for projecting a filter, each of said intermediary holders being provided with optical components, said optical components being secured within said holders, said anchor points being adapted to secure said first, second and intermediary holders together linearly end to end;

wherein, when said intermediary holders are assembled end to end, and said first holder is assembled at one extremity and said other holder is assembled at another extremity, said resulting assembly forms said optical correlator.

In accordance with another aspect of the invention, there is provided a self-supported optical correlator, comprising:

a first holder having two opposite ends, one of said opposite ends being provided with anchor points, the other of said opposite ends being provided with a light source;

a second holder having two opposite ends, one of said opposite ends being provided with anchor points, the other of said opposite ends being provided with a light receiving element, at least one intermediary holder, each of said at least one intermediary holder having two opposite ends, each of said at least one holder being provided with anchor points at each opposite end, at least one of said at least one intermediary holder being provided with a spatial light modulator for projecting an image and another spatial light modulator for projecting a filter, each of said at least one intermediary holder being provided with optical components, said optical components being secured within said holders, said anchor points being adapted to secure said first, second and intermediary holders together linearly end to end;

wherein, when said at least one intermediary holder are assembled, and said first holder is assembled at one extremity and said other holder is assembled at another extremity, said resulting assembly forms said optical correlator.

In accordance with yet another aspect of the invention, there is provided a self-supported optical correlator, comprising a housing for receiving a light source at one extremity and a light receiving element at another extremity, said housing being further adapted to receive optical components therein, said optical components being toleranced and forming an optical correlator, said housing being further adapted to receive therein a display for projecting an image in an optical axis and a display for projecting a filter in said optical axis, said housing being tubular and having an opaque outer surface.

BRIEF DESCRIPTION OF THE DRAWINGS

The present invention will be better understood after having read a description of a preferred embodiment thereof, made in reference to the following drawings in which:

FIG. 2 is a perspective view of the correlator of FIG. 1;

FIG. 3 is a partial cross-sectional view of the correlator of FIG. 1;

FIG. 4 is a representation of a plurality of correlators stacked together;

FIG. 5 is a schematic representation of tagging;

FIG. 6 is a schematic representation of a polarity LUT application;

FIG. 7 (Prior art) is a schematic representation of a typical correlator; and FIG. 8 is a schematic representation of a system using a correlator.

DESCRIPTION OF A PREFERRED EMBODIMENT OF THE INVENTION

Figure 1:
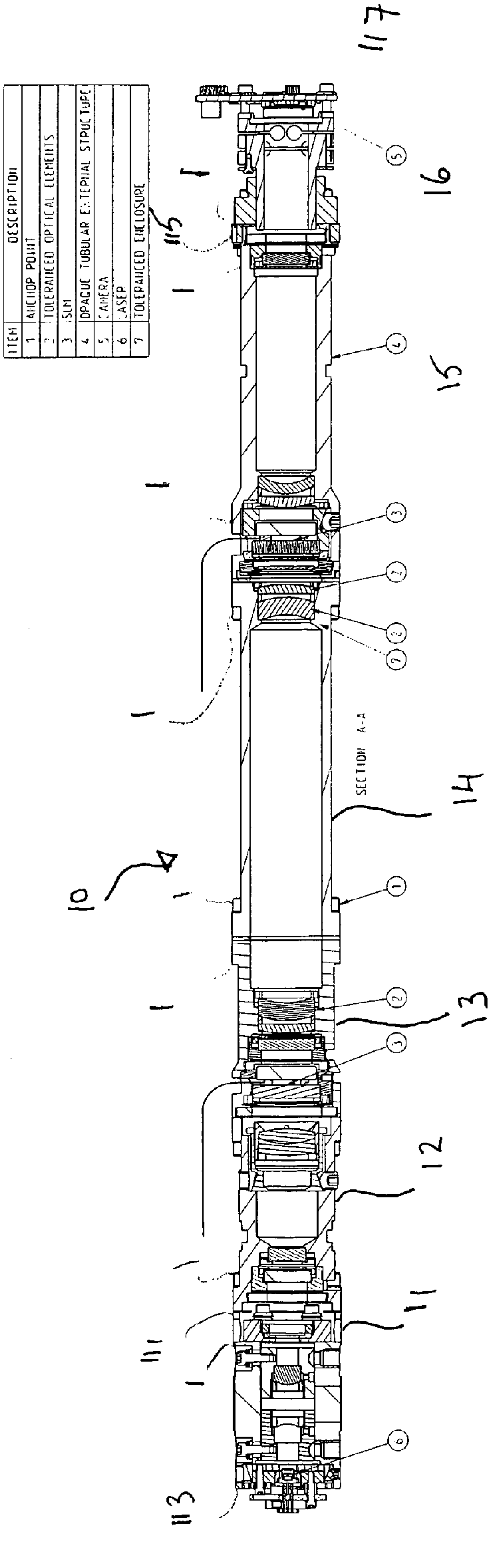
FIG. 1 is a cross-sectional view of an optical correlator according to a preferred embodiment thereof.

The tubular optical correlator optomechanical structure proposes a self-supported tubular architecture illustrated in a preferred embodiment in FIGS. 1 and 2. However, although a combined structure is illustrated in the accompanying Figures, the present invention also concerns an overall structure which may differ.

For example, as will be understood hereinafter, there may be more or less individual holders.

One advantage of the structure of the present invention is that it combines the component holder and the optical structure into a single structure that reduces the overall number of components.

To that effect, the tubular optical correlator optomechanical structure consists in a single tubular assembly structure 10, where the holders of the optical components are used at the same time as building blocks for the tubular optical correlator structure.

More specifically, the tubular optical correlator preferably consists in a first and second holders. The first holder 11 has two opposite ends 111, 113. A first opposite end 111 is provided with anchor points 1 and the other opposite end 113 is provided with a light source 6, preferably a laser.

The second holder 16 has two opposite ends 115, 117. A first opposite end 115 is provided with anchor points 1 and the other opposite end 117 is provided with a light receiving element 5, such as a camera.

The optical correlator 10 further preferably includes a plurality of intermediary holders 12, 13, 14, 15 which are longitudinally assembled together. Each holder 12, 13, 14, 15 has anchor points 1 at each opposite end, and is further provided with optical components 2.

At least one intermediary holder is provided with a display 3 for projecting an image, and another intermediary holder is provided with a display 3 for projecting a filter. In a preferred embodiment of the invention, the displays are of course adapted to the invention, and include spatial light modulators.

Preferably, the holders 11, 12, 13, 14, 15 have an opaque outer surface, and are preferably tubular.

An example of an intermediary optical component holder is illustrated in FIG. 3 where the optical components are inserted in a monoblock tubular structural element. The multiple structural elements are assembled together as illustrated in FIG. 1. Each structural element is attached to the adjacent ones at anchor points. Combined together, all the building blocks generate a single self-supported structure illustrated in FIGS. 1 and 2. No supplementary holding plate or external structure is required to further position and support the component holders.

FIG. 3 illustrates a single structural element or tubular optical correlator module. The optical design of the correlator is toleranced. This means that the optical components may be slightly displaced either laterally or longitudinally, within a mechanical tolerance, without affecting significantly the correlation obtained. The maximum displacement is different for each element of the optical correlator. The optomechanical support must respect fabrication tolerances that are compatible with the maximum displacement permitted for the various optical components. Doing so the optical design prescriptions are respected when using the optomechanical support. The optical components of FIG. 3 are constrained by the housing. Consequently alignment does not require translation or tilt mechanisms reducing the number of components and the time required to align the system.

The use of a tubular architecture provides a rigid self-supported structure that can be further mechanically isolated from the apparatus housing. This will prevent the environmental vibrations to affect the mechanical stability of the optical correlator.

All building blocks are thermally connected, as illustrated in FIG. 1, yielding a short stabilisation period for the tubular optical correlator structure. Moreover, the use a rugged tubular shape minimizes the thickness of the external structure illustrated in FIG. 3 required for a given rigidity when compared to other structures such as cubic or otherwise. With less material, the structure exhibits a smaller thermal inertia reducing consequently the period required to reach the thermal equilibrium of the tubular optical correlator.

The tubular architecture illustrated in FIG. 2 is preferably, as mentioned above, composed of holders exhibiting symmetry of revolution. These modules necessitate mostly turning machining that is cheaper and faster to fabricate than more complex shapes.

The outer walls of the tubular optical correlator optomechanical structure are opaque, as illustrated in FIG. 3, and cover completely the optical path. The light emerging from the optical path is thus confined within the holding structure. Doing so, and taking advantage of the self-supported structure, multiple tubular structures can be laterally stacked along each other (see FIG. 4) without mutually interfering. The tubular optical correlator architecture can thus be easily stackable.

The tubular optical correlator further contains an electronic control unit making use of a digital communication and addressing scheme that introduces onboard image, filter and correlation tagging to uniquely identify source information and corresponding results Based on this tubular optical correlator structure, real-life applications require some more specific items related to signal communication and driving electronic components. In a typical correlator the image and the filter are sent together, then after a certain lapse of time the correlation results is acquired. This process is based on a basic clock and is a continuous process. When the main control system send images and filters to the correlator there is an uncertainty about the correlation retrieval identification. Due to potential delays in processing time, in copy time, in transfer time or simply in display time, the correlation retrieved could come from the current image-filter pair sent, from the previous one, or from the ones sent some frames ago.

To obviate this uncertainty, according to a preferred embodiment of the invention, a tag is inserted in the image (Itag) and in the filter (Ftag) as illustrated in FIG. 5. When the optical correlator electronic driver receives the image-filter pair, the tag is extracted and copied on the following correlation (Ctag). When the correlation is sent back to the control system there is no temporal uncertainty between the filter and the image that were correlated and the corresponding result.

Many optical correlators use spatial light modulators that are driven with alternative polarity mode. Among others, this is done with liquid crystal technologies. The image is displayed first in a positive polarity, then in the following frame the image is displayed in inverted polarity. This prevents electrolysis of the liquid crystal display. However, inverting the signal polarity usually implies using the driving electronic components at a slightly different operation point yielding different response curves. Driving the spatial light modulator active medium with this signal can thus yield to a different response curve for the positive and the negative polarity.

To compensate for this effect, the present invention proposes the use of two look-up tables that can be used and applied alternatively to the positive polarity and the negative polarity frame.

FIG. 6 illustrates the temporal sequence of the look-up table implementation. At Time 1, a first set of look-up tables is applied to the image and filter. Then, at Time 2, the set of look-up tables corresponding to the reverse polarity is applied to the image and filter. Following this, at Time 3, the polarity is reversed back to the initial state and the first set of look-up tables is applied again. The look-up tables are applied over time with the same sequence. Once the look-up tables applied, the image and the filter are displayed on their respective spatial light modulator (SLM) destination. This makes the response more uniform and provides better temporal stability to optical correlation.

The tubular optical correlator is further equipped with a digital communication link and addressing scheme. When interfacing with a control system, the use of analog video signal in the correlator requires video resampling that may induce slight jitter in the video signal can translate in slight modification of the image and filter positions or smoothing of the edges of the image and the filter. With a pixel-to-pixel addressing scheme each pixel of the memory is addressed to a single pixel on the spatial light modulator without spatial resampling. This provides more stable image and filter display as well as better conformity between the information to be displayed and the signal actually displayed.

A complete system is illustrated in FIG. 8. A camera 30, or any other external sensor, captures an image such as scene 40. The output of the camera is sent to the input SLM. The driving electronics 21 apply a filter at filter SLM, and are further connected to the camera 5 for collecting the result of the correlation. The driving electronics further control the other aspects of correlation, such as tagging and using look-up tables. Alternately, the external sensor 30 could be connected to the driving electronics 21, which would in turn be connected to the input SLM.

As mentioned previously, the invention has been described made with reference to a preferred embodiment thereof. However, the invention does contemplate a variety of different structures for the holder. For example, one could envisage a holder made of two pieces, each piece being in the shape of a half-pipe. The pieces are machined to form receivers to receive the various components therein, so that when the half-pipes are joined together to form a tube, the components fit within the receivers and align in order to form the optical correlator. Furthermore, although a plurality of intermediate holders have been described, there may be as little as one, provided that the design allows for the insertion of the various components.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A self-supported optical correlator, comprising:

a first holder having two opposite ends, one of said opposite ends being provided with anchor points, the other of said opposite ends being provided with a light source;

a second holder having two opposite ends, one of said opposite ends being provided with anchor points, the other of said opposite ends being provided with a light receiving element, a plurality of intermediary holders, each having two opposite ends, each of said holders being provided with anchor points at each opposite end, at least one of said intermediary holders being provided with a spatial light modulator for projecting an image and another of said intermediary holders being provided with another spatial light modulator for projecting a filter, each of said intermediary holders being provided with optical components, said optical components being secured within said holders, said anchor points being adapted to secure said first, second and intermediary holders together linearly end to end;

wherein, when said intermediary holders are assembled end to end, and said first holder is assembled at one extremity and said other holder is assembled at another extremity, said resulting assembly forms said optical correlator.

2. A self-supported optical correlator according to claim 1, wherein each of said first, second and intermediary holders have an opaque outer surface, and a hollow inside, said inside defining a longitudinal optical axis.

3. A self-supported optical correlator according to claim 2, wherein said of said first, second and intermediary holders and said optical components are toleranced.

4. A self-supported optical correlator according to claim 2, wherein said optical correlator is mechanically insulated from environmental vibration.

5. A self-supported optical correlator according to claim 2, wherein connections at said anchor points further include thermal connections.

6. A self-supported optical correlator according to claim 2, wherein said first, second and intermediary holders are tubular.

7. A self-supported optical correlator according to claim 2, wherein said optical correlator is adapted to be laterally stacked.

8. A self-supported optical correlator according to claim 2, further comprising a control unit, said control unit introducing a tag in an image and in a filter, so that when an optical correlator electronic driver receives an image-filter pair, said tag is extracted in order to ensure correlation between said filter and said image.

9. A self-supported optical correlator according to claim 2, wherein said correlator uses two look-up tables applied to an image and a filter, a first look-up table being of normal polarity and a second look-up table being of reversed polarity, said first and second look-up tables being used alternately.

10. A self-supported optical correlator, comprising:

a first holder having two opposite ends, one of said opposite ends being provided with anchor points, the other of said opposite ends being provided with a light source;

a second holder having two opposite ends, one of said opposite ends being provided with anchor points, the other of said opposite ends being provided with a light receiving element, at least one intermediary holder, each of said at least one intermediary holder having two opposite ends, each of said at least one holder being provided with anchor points at each opposite end, at least one of said at least one intermediary holder being provided with a spatial light modulator for projecting an image and another spatial light modulator for projecting a filter, each of said at least one intermediary holder being provided with optical components, said optical components being secured within said holders, said anchor points being adapted to secure said first, second and intermediary holders together linearly end to end;

wherein, when said at least one intermediary holder are assembled, and said first holder is assembled at one extremity and said other holder is assembled at another extremity, said resulting assembly forms said optical correlator.

* * * * *